(12) United States Patent
Scott et al.

(10) Patent No.: US 7,684,418 B2
(45) Date of Patent: Mar. 23, 2010

(54) SERVICE ACCESS GATEWAY

(75) Inventors: James Scott, Lisburn (GB); Anders Hybertz Jensen, Copenhagen OE (DK); Damien Dougan, Belfast (GB)

(73) Assignee: Aepona Limited, Belfast (GB)

( * ) Notice: Subject to any disclaimer, the term of this patent is extended or adjusted under 35 U.S.C. 154(b) by 1016 days.

(21) Appl. No.: 11/105,357

(22) Filed: Apr. 14, 2005

(65) Prior Publication Data

US 2005/0185661 A1 Aug. 25, 2005

Related U.S. Application Data

(63) Continuation of application No. PCT/EP03/11417, filed on Oct. 15, 2003.

(60) Provisional application No. 60/418,356, filed on Oct. 16, 2002.

(51) Int. Cl.
H04L 12/56 (2006.01)
(52) U.S. Cl. ...................... 370/401; 709/223
(58) Field of Classification Search ............... 370/401; 709/212, 225, 226, 249; 725/112
See application file for complete search history.

(56) References Cited

U.S. PATENT DOCUMENTS

| | | | |
|---|---|---|---|
| 6,519,568 B1 * | 2/2003 | Harvey et al. .................. 705/1 |
| 6,785,704 B1 * | 8/2004 | McCanne ................... 718/105 |
| 7,035,907 B1 * | 4/2006 | Decasper et al. ............ 709/212 |
| 7,293,109 B2 * | 11/2007 | Ott et al. ..................... 709/249 |
| 2002/0099776 A1 * | 7/2002 | Cafarella et al. ............ 709/206 |
| 2003/0046396 A1 * | 3/2003 | Richter et al. .............. 709/226 |
| 2003/0054810 A1 * | 3/2003 | Chen et al. ................. 455/422 |
| 2003/0105864 A1 * | 6/2003 | Mulligan et al. ............ 709/225 |
| 2003/0120502 A1 * | 6/2003 | Robb et al. .................. 705/1 |
| 2003/0158923 A1 * | 8/2003 | Burkhart ..................... 709/223 |
| 2004/0031058 A1 * | 2/2004 | Reisman ..................... 725/112 |

FOREIGN PATENT DOCUMENTS

| | | |
|---|---|---|
| EP | 1079315 | 2/2001 |
| EP | 1179960 | 2/2002 |
| EP | 1331784 | 7/2003 |
| WO | WO00/48365 | 8/2000 |
| WO | WO01/28186 | 4/2001 |
| WO | WO01/43390 | 6/2001 |

(Continued)

OTHER PUBLICATIONS

Neuman, Proc of the Intl Conf on Distr Comput . . . , pp. 283-291, May 25, 2993, Proxy-based authorization and accounting for . . . .

(Continued)

Primary Examiner—Thong H Vu
(74) Attorney, Agent, or Firm—Jacobson Holman PLLC

(57) ABSTRACT

A gateway (1) interfaces between application providers (APs, (4)) and at least one aggregate AP (3) which in turn is linked to multiple APs (4). The gateway (1) manages cascading of access control rights by the APs (4) to reflect links via aggregate APs (3). On the other side the gateway (1) is linked with mobile network enablers (10-15) for communication with users. The gateway (1) performs convergence by conditionally processing or rendering content with multiple content and/or bearer formats. Internally, the gateway (1) comprises a CORBA middleware mechanism (20), and multiple services (21-23) communicating with each other via the middleware mechanism.

30 Claims, 9 Drawing Sheets

FOREIGN PATENT DOCUMENTS

WO     WO 02/059787 A1     8/2002

OTHER PUBLICATIONS

Hideaki Yumiba, et al.; IP-Based IMT Network Platform; IEEE Personal Communications Magazine, Oct. 2001, pp. 18-23, 1070-9916/91, Published by IEEE Personal Communications Society, Piscataway, New Jersey.

Translated copy of Japanese Office Action, Japanese Patent Appln. No. 2004-544238, Drafted Apr. 28, 2009, JPO Examiner: Ishida, Noriyuki, Dispatch No. 289186, Dispatch date: May 12, 2009.

\* cited by examiner

SERVICE ACCESS GATEWAY

This is a continuation of PCT/EP03/11417 filed Oct. 15, 2003 and published in English which in turn is based on provisional Application No. 60/418,356 filed Oct. 16, 2002.

FIELD OF THE INVENTION

The invention relates to communication of content between external domains and the mobile network domain and to the provision of services and the management of services and service and content providers located outside the mobile network domain.

PRIOR ART DISCUSSION

It is known to provide a server for bridging the Internet and mobile network domains, as described in European Patent Specification No. 1079315A2. This server receives a request for a document and passes a request to an origin server. It receives the document from the origin server and performs a syntactical transcoding using client semantics preferences. There are both syntactical and protocol transcoders in the server.

The invention is directed towards providing a service access gateway meeting some or all of the following objectives:
  being particularly versatile for set-up for operation in a particular environment, and/or
  allowing interaction in a controlled manner with multiple application providers (APs) in the Internet domain, even if they are aggregated in which a single AP server is in turn linked on to group(s) of further APs, and/or
  caters in a controlled manner with convergent content formats, in which content of a first format affects content of a second format to provide an output content with a third format, and/or
  allows interaction in a controlled manner between application providers and services with a multiplicity of network bearers and services to facilitate the provision of applications which combine such multiple bearers and services into single 'convergent' subscriber services.

SUMMARY OF THE INVENTION

According to the invention, there is provided an access gateway comprising:
  a content server interface,
  a mobile network interface, and
  a processor for bi-directionally routing content-rich messages between said interfaces.

In one embodiment, the processor comprises a plurality of services, including an edge service for interfacing with the content server interface and an edge service for interfacing with the mobile network interface.

In another embodiment, each service includes a plurality of components, each for operating autonomously within the service in communication with other components within the same service.

In a further embodiment, each service comprises a queuing mechanism and an event dispatcher, and each component places an output message in a queue of the queuing mechanism and the event dispatcher routes events from the queue to next components of the service.

In one embodiment, each service comprises routing information stored at creation of the service and the event dispatcher routes events according to said routing information.

In another embodiment, the gateway further comprises a middleware internal communications mechanism and each service comprises a middleware handler for retrieving messages from a channel of the middleware communications mechanism and a handler for placing messages on a channel of the middleware communications mechanism.

In a further embodiment, a single handler of each service both retrieves messages and places messages.

In one embodiment, at least one service comprises a content protocol converter component.

In another embodiment, said component converts between an external content protocol and a content protocol which is internal to the gateway and is used for processing of content by the gateway between the two interfaces.

In a further embodiment, at least one service comprises a logic rule component for processing message content.

In one embodiment, the processor comprises a work flow manager for routing messages within the gateway.

In another embodiment, the work flow manager routes a message by parsing a message to determine a routing list.

In a further embodiment, the work flow manager embeds a routing list within the message.

In one embodiment, the work flow list is embedded as an extension to an internal-format mark-up language within the message.

In another embodiment, the work flow manager is a service within the gateway.

In a further embodiment, the gateway comprises a middleware communications mechanism, the work flow manager service subscribes to a default middleware channel, and an edge service automatically places a message received at either server interface onto the default channel.

In one embodiment, each service places a message onto the default channel if it does not detect a next service indicator in the work flow list.

In another embodiment, a service is a transaction logging service and said service terminates a message by storing message data if there is no next service in the work flow list.

In a further embodiment, the processor performs convergence by using a plurality of messages with different content formats to generate an output message with a different content format.

In one embodiment, the processor performs convergence by using a plurality of messages with differing underlying bearers to provide a single coherent message.

In another embodiment, the processor performs convergence by conditionally processing or rendering content or messages from network bearers according to data received from other network systems.

In a further embodiment, a session manager service manages linkages between the gateway and external systems for convergence.

In one embodiment, the processor converts a content format in a received message to an internal format and processes the message in said internal format.

In another embodiment, the internal format is a mark-up language.

In a further embodiment, the gateway receives an input message with content of a first format, converts the first format to an internal format, converts the internal format to a second format and routes the message to an external system, receives a response from said external system with said content in a third format, converts said third format to the internal format, and generates an output message with said content in a fourth format.

In one embodiment, the processor comprises an access control authorization function for managing access rights and user service policies of application provider servers.

In another embodiment, said function generates a set of access control rights and a user service policy with rights for direct access by the associated application provider server, and a schema of maximum rights which can be assigned by the application provider server in a cascading structure.

In a further embodiment, said function automatically checks a fresh request for access rights and user service policy against a schema of an existing set of rights.

In one embodiment, said function is a provisioning service within the gateway which communicates with other services of the gateway via an internal middleware mechanism.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:—

DESCRIPTION OF THE EMBODIMENTS

Figure 1:
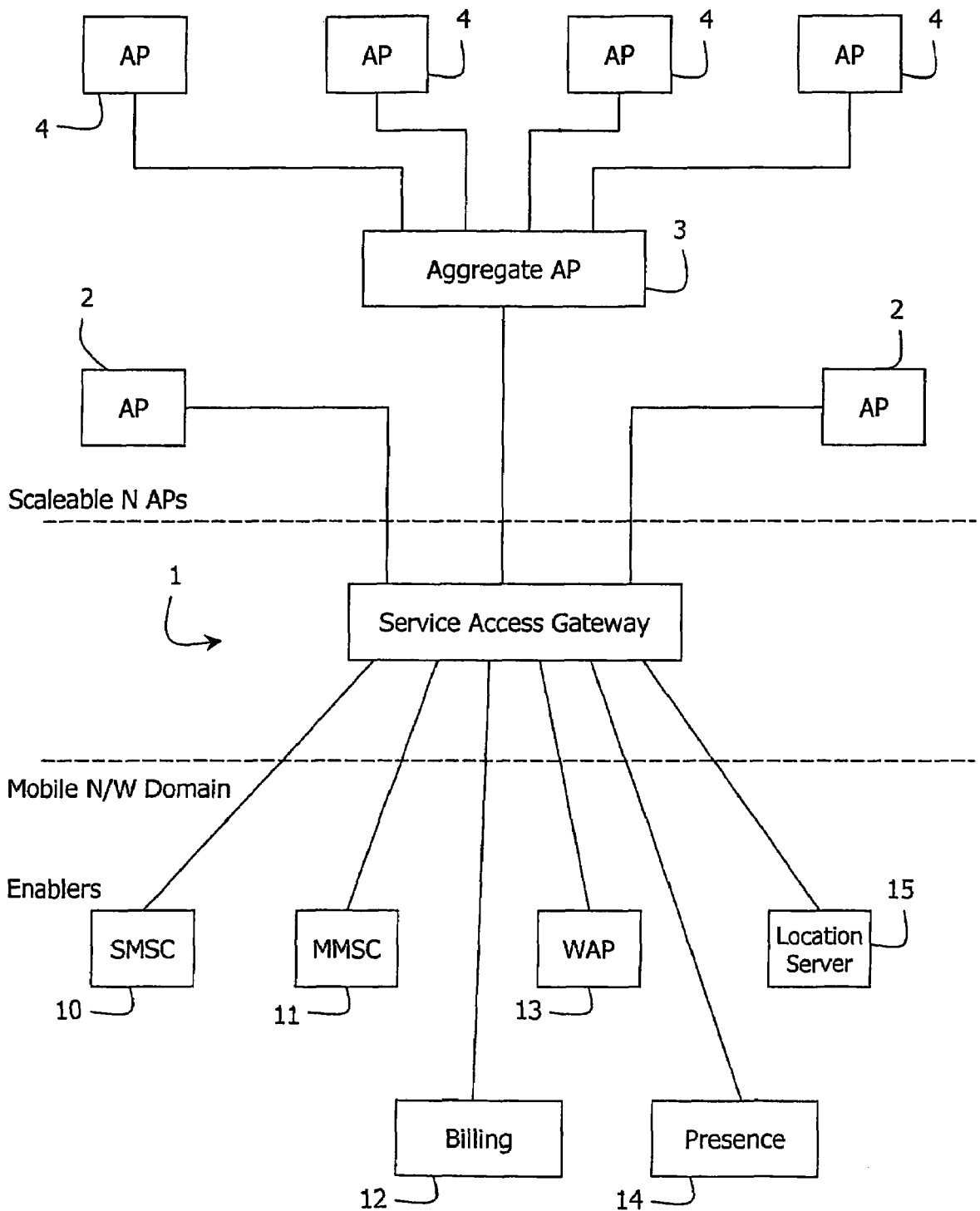
FIG. 1 is a high level diagram showing a service access gateway of the invention and its environment in a typical deployment.

Referring to FIG. 1 a service access gateway 1 is located to interface between an external domain, such as the Internet, and a mobile operator's domain. In the former, it interfaces with individual application provider servers 2 ("AP"s) and with an aggregate AP server 3, which in turn is linked with multiple individual APs 4. There may be a cascaded arrangement, with one aggregate AP being linked to one or more further aggregate APs. On the mobile network side the gateway 1 interfaces with a wide variety of mobile network enablers including a short message service centre (SMSC) 10, a multi-media message service centre (MMSC) 11, a wireless application protocol (WAP) gateway 13, a location server 15, and a presence server 14. The interconnections on both sides vary with the particular situation.

The gateway 1 can be set up in a very versatile manner to handle mobile station requests for and any download of a wide variety of content-rich messages. It does this for simple or complex cascaded AP arrangements and in a manner for convergence of content formats and/or bearers in a dynamic manner. This may include conditional delivery or non-delivery according to service logic and data returned from network services such as location server, presence server or time server. This is described in more detail below.

Figure 2:
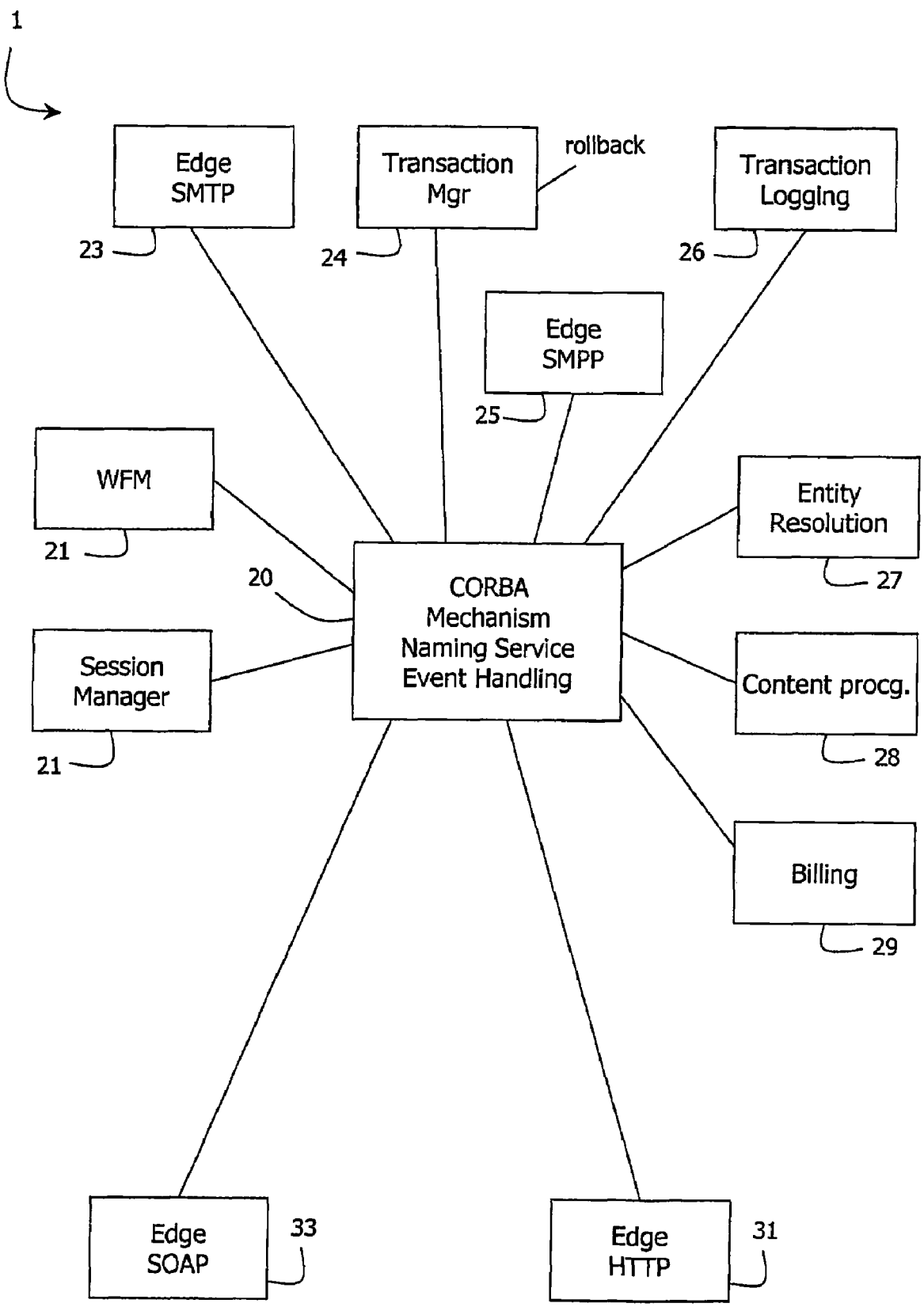
FIG. 2 is a diagram of the internal architecture of the gateway in one embodiment.

Referring to FIG. 2, the gateway 1 comprises one or more services and an underlying CORBA middleware communication mechanism 20. In this embodiment the gateway has the following services, although this will be different for each set-up of the gateway software architecture, determined according to the environment:

21: a session manager;
22: a work flow manager (WFM);
23: an edge SMTP bearer service;
24: a transaction manager;
25: an edge SMPP bearer service;
26: a transaction logging service;
27: an entity resolution service;
28: a content processing service;
29: a billing service;
31: an edge HTTP service 31; and
33: an edge SOAP bearer service.

The word "edge" is used for services forming interfaces to external networks or mobile network domains, the remainder being for internal processing within the gateway.

Figure 3:
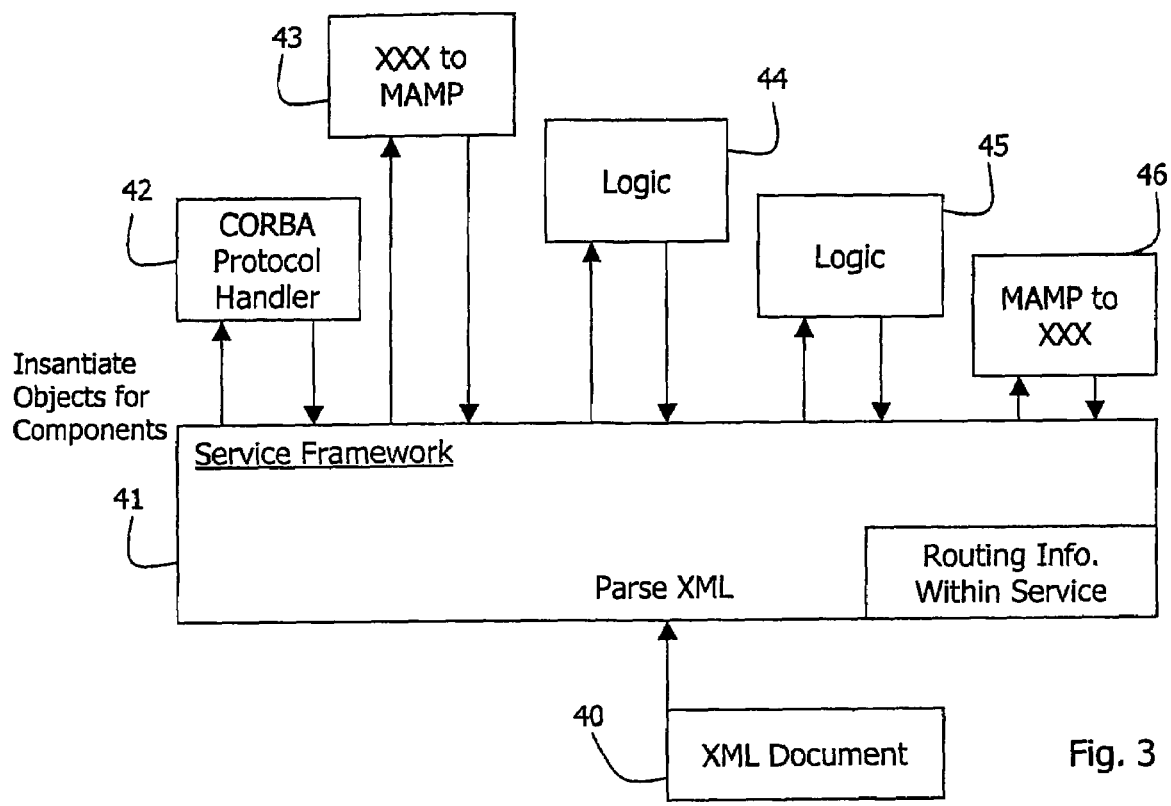
FIG. 3 is a diagram illustrating instantiation of a service of the gateway.

The manner in which an individual service is instantiated is illustrated in FIG. 3.

A service framework 41 comprises executable code for parsing an XML configuration document 40 and instantiating components of the target service according to parsing of the instructions. There may be more than one XML configuration document. FIG. 3 shows generation of a CORBA protocol handler 42, an XXX to MAMP component 43, logic components 44 and 45, and a MAMP to XXX component 46. The components are instantiated by the framework 41 according to the parsed XML. The term "XXX" is used to highlight the versatile nature of the operation of the framework 41 for configuration. It may instantiate components for a variety of formats to/from MAMP, the internal language. The components register themselves automatically to the service framework 41 in an autonomous manner. The registration is indicated by the arrows from the components to the framework 41. As part of instantiation of the components the framework 41 stores information for routing of messages internally within the service. This is also gleaned by parsing the XML document 40.

Figure 4:
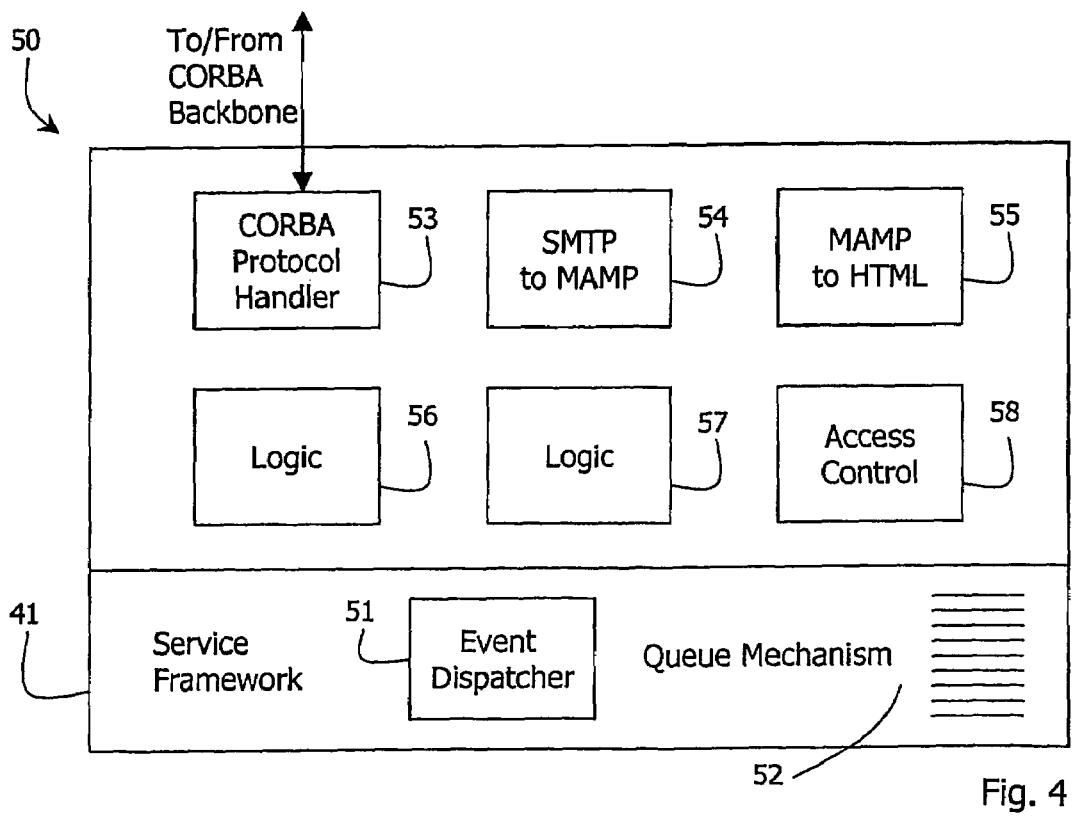
FIGS. 4, and 5 are diagrams of different services.

Referring to FIG. 4 an example service 50 comprises the following components:

53: CORBA protocol handler;
54: SMI to MAMP converter;
55: MAMP to HTML converter;
56, 57: logic components for business rules; and
58: access control.

As shown in FIG. 4, the framework 41 also plays a very important role after configuration, in run-time. It comprises an event dispatcher 51 and a queue mechanism 52, described in more detail below.

Figure 5:
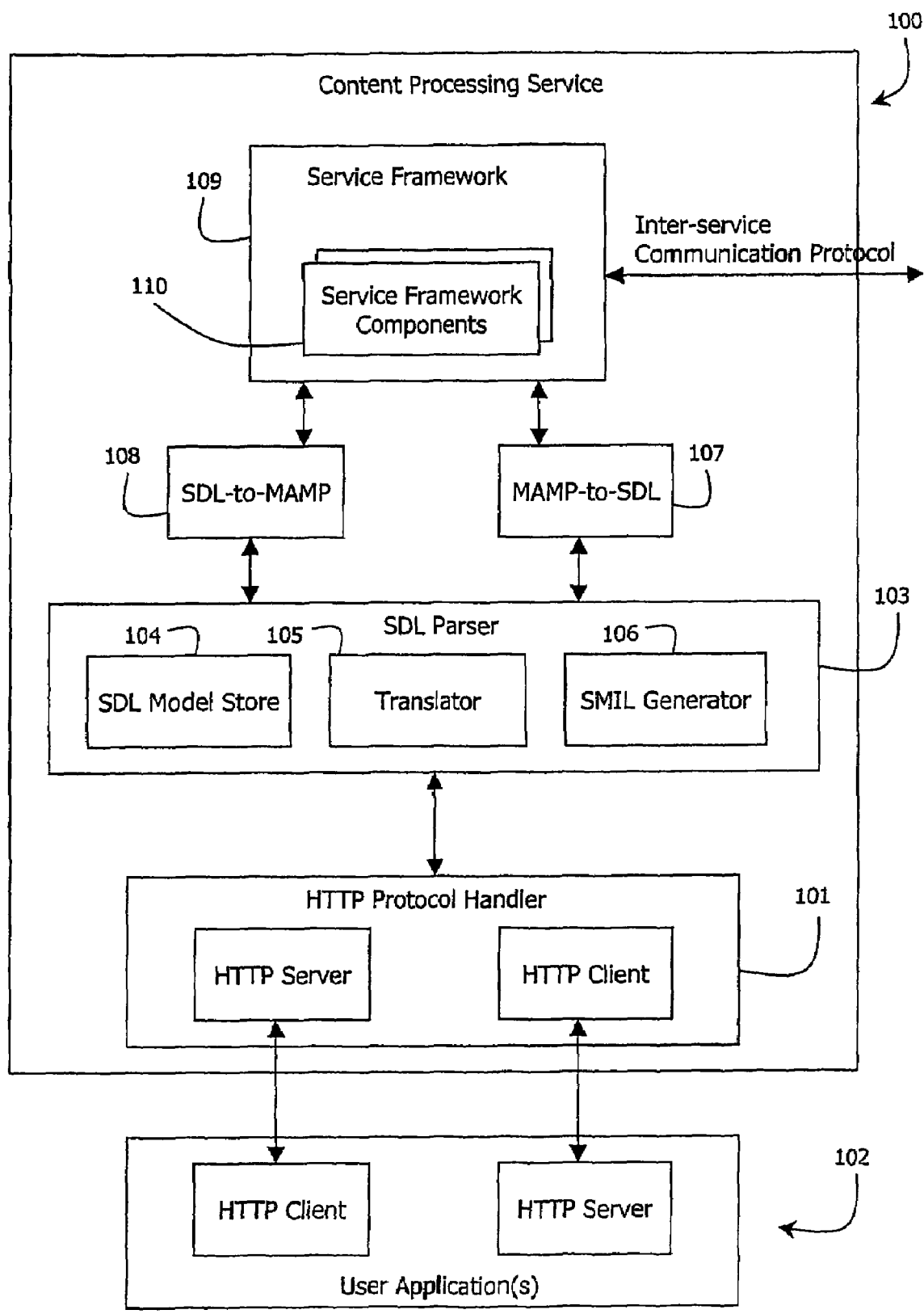

A service 100 shown in FIG. 5 is an edge service, interfacing with external (of the gateway 1) HTTP devices 102. Its components include:

a HTTP protocol handler 101, with MGS to HttpPush interaction functionality,
an SDL parser 103 containing model store 104, translator 105, and SMIL generator objects for converting content from external formats to SMIL format for delivery to mobile devices;
a MAMP to SDL converter 107;
an SDL to MAMP converter 108; and
a service framework 109 having internal components 110 including an event dispatcher.

It will thus be appreciated that the service framework allows a wide variety of services to be generated in a versatile manner according to XML instructions encoded in an XML configuration document. The precise mechanism for generating the components from XML is by the dynamic loading of modules or components referenced in the XML configuration document.

Figure 6:
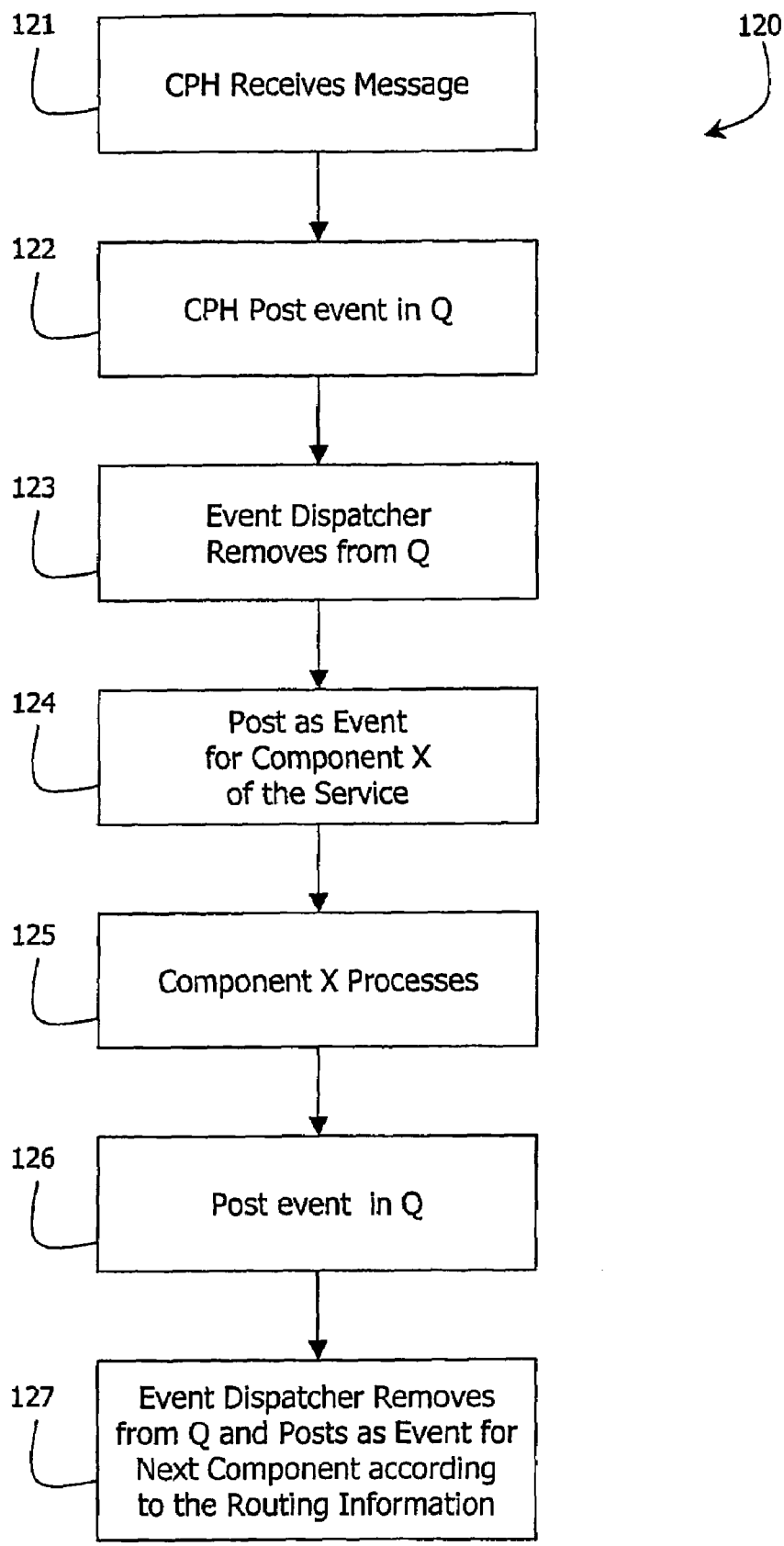
FIG. 6 is a flow diagram illustrating internal messaging within a service.

Internal communication within a service is illustrated in FIG. 6 as a flow sequence of steps 121 to 127. In step 121 a CORBA protocol handler ("CPH") receives an event in MAMP format from another service. In step 122 the CPH places an event in a queue of its service framework's queueing mechanism 52. The service framework's event dispatcher 51 in steps 123 and 124 posts the event as an event object for a component of the service according to the stored internal routing information. This component processes the event in step 125 and posts a further event in a queue in step 126. In step 127 the event is then dispatched to the next component of the service, again according to the routing information. Thus, internal communication within each service is achieved using the framework's queueing mechanism 52 as a hub for internal events, under control of the event dispatcher 51 using the routing information stored upon generation of the service from the XML configuration document.

Figure 7:
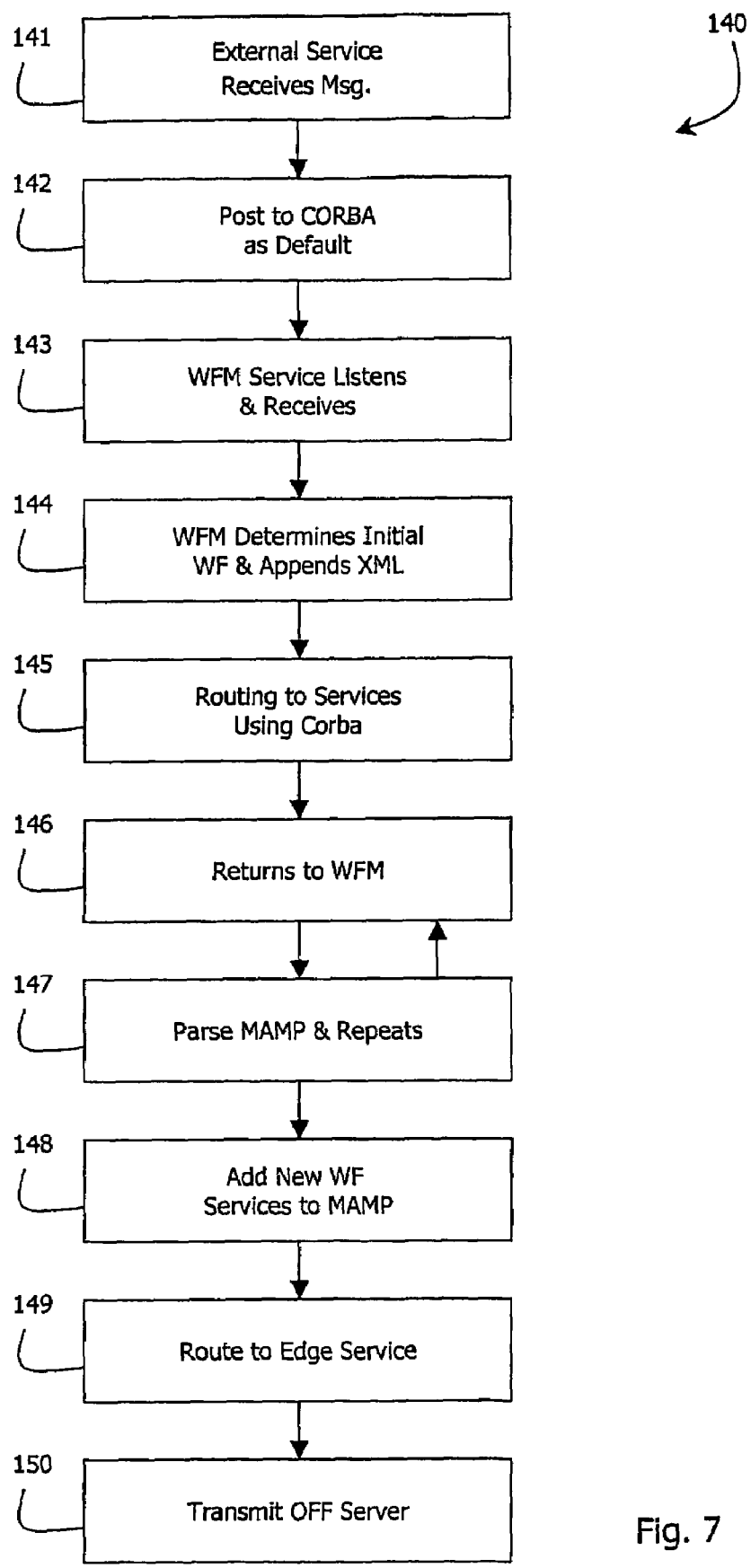
FIG. 7 is a flow diagram illustrating message flow through the gateway.

FIG. 7 illustrates inter-service communication within the gateway 1 as a method 140 having steps 141 to 150. In step 141 an edge service receives a message. The protocol for content for messages within the gateway 1 is as proprietary internal XML-based language called MAMP. Irrespective of the protocol/format of incoming content it is always converted within the gateway to MAMP. In step 142 the message is posted onto a default channel in CORBA as it does not have a work flow routing list.

In step 143 a work flow manager ("WFM") service, which is listening on the default CORBA channel receives the message. In step 144 the WFM service determines an initial work flow list for the messages according to its logic component(s) and appends the list as MAMP to the message. The CPH component of the WFM service then reads the list and places the message on the relevant channel for CORBA 20. Step 145 indicates overall routing of the message between services arising from the CPH of each service in turn reading the work flow list and placing the message on the relevant CORBA 20 channel. When it reaches a service without a next service indicator in the list the protocol handler (CPH) places the message on the default CORBA channel, from where it is retrieved by the WFM service in step 146. This service does not "know" that it has previously processed this message, and it is simply treated as any other message retrieved from the default CORBA channel. Thus the WFM service parses the MAMP and according to its logic component(s) applies a work flow to the message in step 148. Automatically, the message is routed in step 149 to an edge service, having an external MAMP to XXX component which routes the message externally of the gateway to the relevant enabler in the mobile network domain in step 150.

It should be noted that the final destination of an incoming message need not necessarily be off the gateway 1. It could alternatively be an internal service message.

Figure 8:
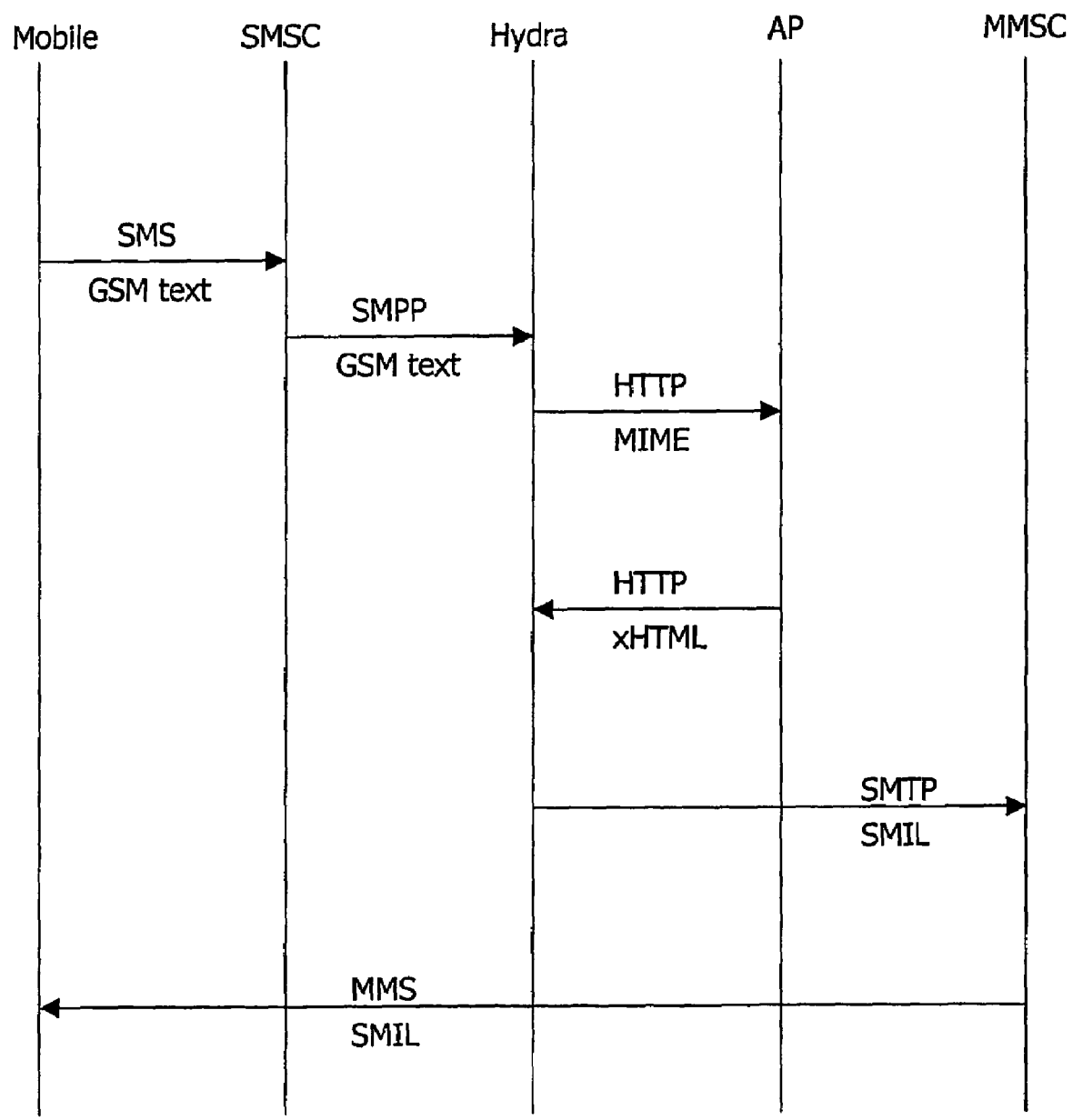
FIG. 8 is a message transfer diagram illustrating convergence of content formats.

Referring to FIG. 8, communication of content messages between the gateway 1 ("Hydra") and the external systems in the Internet and mobile network domains is illustrated. In this diagram, notation above the arrowed lines indicates the bearer (e.g. SMS) while notation below these lines indicates the content format (e.g. xHTML). It will be appreciated from this diagram that a message originating on an SMS bearer with GSM text content is processed by the server 1 using an output from an AP of xHTML content on an HTTP bearer to provide a final message to the mobile station of SMIL content on an MMS bearer. This is called "convergence". In this specification, the ability to take control data and/or content in various independent formats from multiple network bearers or services and by internal processing or rendering 'converge' these to provide a single independent message or message stream.

Figure 9:
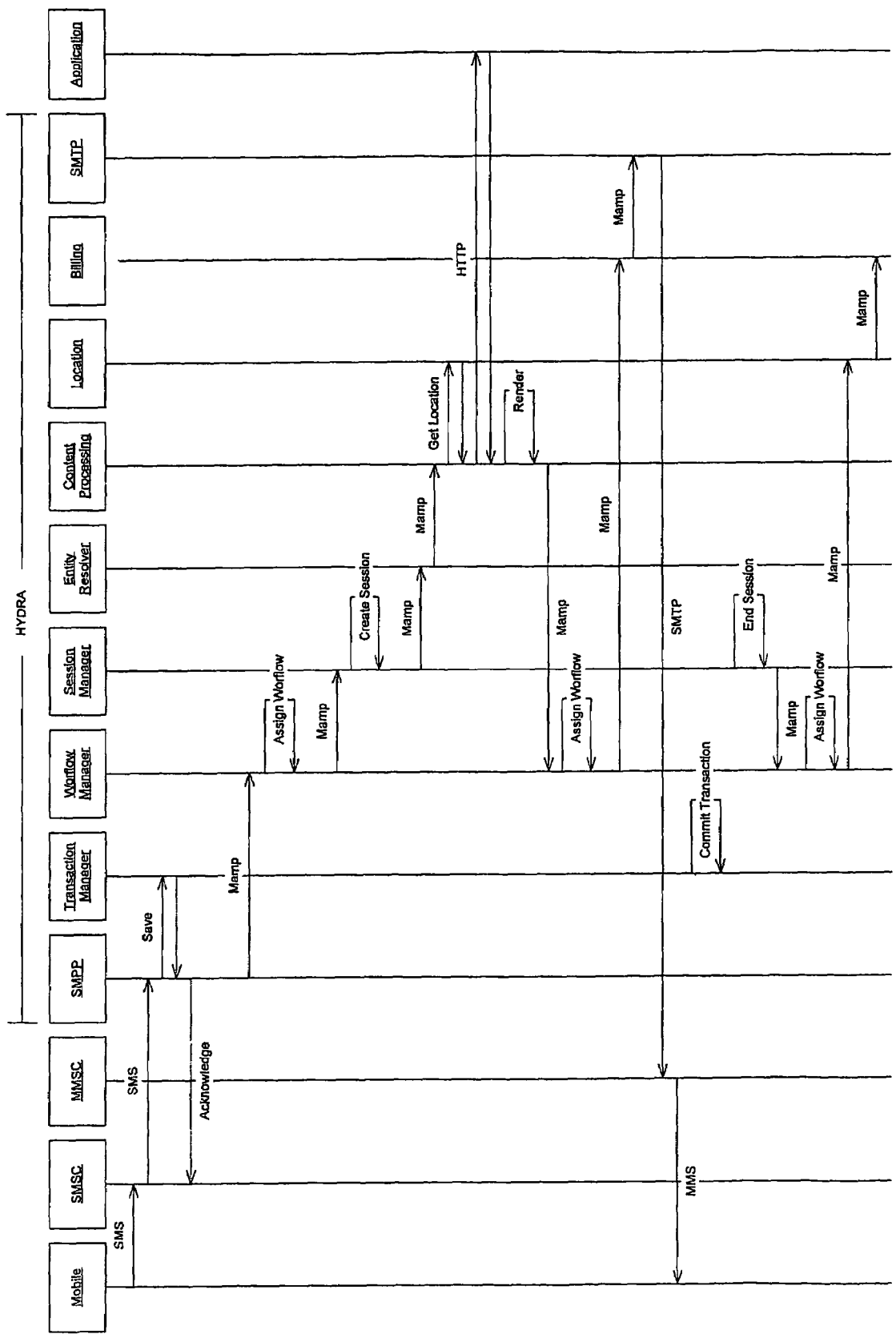
FIG. 9 is a more complex message transfer diagram showing convergence.
Figure 10:
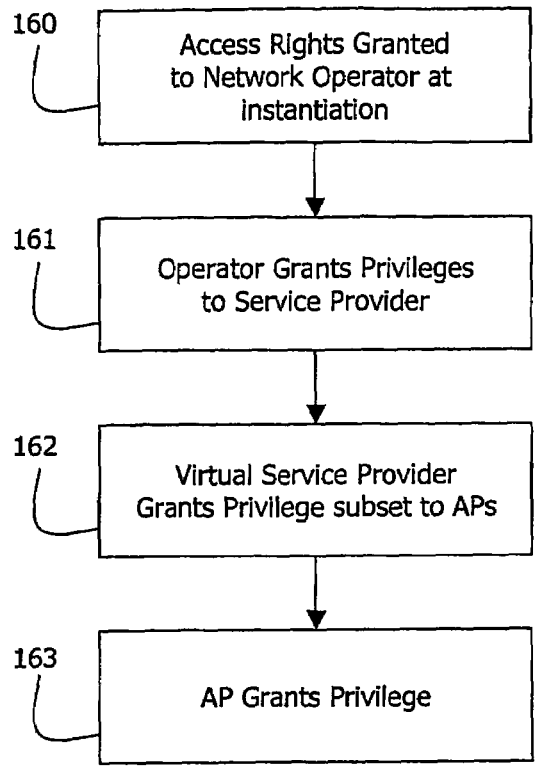
FIG. 10 is a flow diagram illustrating cascading of access control.

A more complex example is shown in FIG. 9. This use case highlights three aspects of convergence:

From the mobile user perspective—sending an SMS in and obtaining an MMS out to the same phone—namely convergent transmission and delivery.

From the application perspective—two applications combining to offer increased information—namely a location system being used to feed data to the application to support location-dependent processing without the application developer having to access a location register.

From the content perspective—retrieving XHTML from the application and supplying SMIL to the mobile phone.

The following describes the messages.

(1) Mobile phone user sends an SMS containing a keyword to the SMSC. Unknown to the mobile phone user, the keyword actually identifies a convergent service or a virtual service (which does not actually exist, but Hydra allows it to appear to do so, by combining the web-based application with the location details). The terms "convergent service" and "virtual service" means a service as viewed by the user, not an internal part of the gateway 1 such as the services 21-33 of FIG. 2.

(2) The SMSC sends the SMS to an SMPP service within Hydra.

(3) The SMPP service ensures that the message will not be lost by storing it in a transaction manager service, and then acknowledges the message receipt to the SMSC. Hydra is now responsible for the message.

(4) The SMPP service sends the MAMP message out to the default message channel—which will be picked up by the workflow manager.

(5) The workflow manager, using its rules, assigns workflow elements to the MAMP message. In this case, it assigns the following workflow steps: session manager, entity resolver, and content processor. It cannot determine any further steps, since it does not know what form of output the content processor will generate.

(6) The session manager creates a new session. This allows the content processor to cache rendered information, and billing to generate CDRs against the session usage.

(7) The entity resolver service places additional data into the MAMP message based on the resolution of various addresses mapping to internal UUIDs.

(8) The content processor uses the application definition for the resolved entity to determine it is actually a convergent service, and thus needs to obtain location information before making the request to the actual application.

(9) The location service places additional data into the MAMP message related to the mobile phone users' current location.

(10) The content processor uses HTTP to obtain XHTML from the application. The request to the application includes location information—thus abstracting the application from the operator's location register, and allowing the application and location register to converge. For example, the application may be a movies information application—and with the addition of location information from the location register and conditional processing based on the service definition from the XML configuration, can specify city-specific cinema listings.

(11) The content processor renders the XHTML from the application into a form suitable for display on the mobile phone.

(12) The workflow manager service receives the updated MAMP message. Different rules will not match the MAMP message, allowing new workflow to be assigned to take the MAMP message to: billing, SMTP.

(13) The billing service calculates the cost based on the current session information. A check is made against the pre-paid credit (assuming the mobile user is pre-paid). This is done after the content processing since it cannot pre-determine the rendering format (SMS or MMS), nor the number of messages required to resolve the application's XHTML (e.g. may require several MMS to send a large number of images).

(14) The SMTP service sends the contents of the MAMP message (i.e. the rendered content from the application) to the MMSC via SMTP protocol.

(15) The MMSC acknowledges receipt of the message, allowing the transaction manager service to commit the transaction.

(16) The MMS is sent to the mobile phone user.

(17) After a period of no further activity within the current session, the session manager expires the session, triggering a new MAMP message to the workflow manager service.

(18) The workflow manager service applies rules to the MAMP message, and determines that it should visit the following services so they may clean up their session-related processing: content processor, billing.

In another example of convergence a subscriber transmits a GSM text message with the word "news" to a particular MSISDN. The SMSC delivers the messages to the gateway 1 (Hydra). Hydra accesses the relevant AP and receives xHTML content, it translates this to MMS, and sends the MMS content to the MMSC of the mobile network. The MMSC in turn delivers the MMS content to the subscriber.

In a further example use case, the subscriber replies to the above MMS with selection of an option within the MMS. The MMSC delivers the message to Hydra, which internally retrieves the xHTML content of the previous session from the session manager, and translates it to MMS. This MMS is sent to the MMSC, which then routes it to the subscriber. It will be appreciated from the last scenario above that operation of a session control or control service within Hydra can be very important. It provides an important link between one cycle and another of an overall session. In more detail, this facilitates session-based application navigation, which is essential in providing a useable convergent service by maintaining current state where there may be several sequential atomic user service level transactions across multiple bearers. In the following passages the terms "convergent service" and "user service" are not to be confused with the internal gateway services such as the services of FIG. 4. They are a service as seen by a user. For example in a user service which may require subscriber input via traversal of multiple menu levels via WAP or IVR, with intermediate service data or content delivery to the subscriber via SMS or MMS, session based application navigation maintains the current subscriber state within the transaction so that the subscriber is returned to most logical location in the service based on his progress as stored in his current session.

A specific example is to allow the user service to resume at a logical point in the event of certain internal failure, rather than forcing the subscriber to re-start his user service interaction. Additionally, session control also allows the convergent service to be managed at a level higher than possible through the management of the component bearers or internal gateway services. Session management allows user service-level billing and charging events to be generated on the service access gateway, which facilitates the billing of the user service independently, and without the need for co-relation of the billing records generated by the component bearer systems, where a logical linkage between events across different systems relating to a common 'convergent' service transaction may be available.

Session control also facilitates user service management—by monitoring the current state of user services, and monitoring user service activity, detecting user service abnormalities and applying session-level service management parameters such as idle timeouts, which might otherwise be invisible when managing the user service through the management of the individual bearer systems. A specific example would be in a user service where a content download request was made by the subscriber by SMSC and where the content is delivered by MMSC. In the case of billing for this user service, without session management it may be necessary to co-relate the billing record from the SMSC with the billing record from the MMSC relating to the delivery of the content to bill for the user service. Session management facilitates user service level billing from the gateway 1 by tracking the progress of the transactions through the SMSC and the MMSC and generating an appropriate billing event at an appropriate stage in the session. Using the same example, in the event of the SMS requesting the user service being successfully delivered to the application provider—whereupon a failure occurred causing no MMSC to be returned containing the requested content. Session management facilitates the detection of this error by monitoring the session activity, and logging the failure. Without session management, such a failure is very difficult to detect with the operator's network by monitoring the activity of the two independent bearers services, since no failure of either bearer has occurred.

Figure 11:
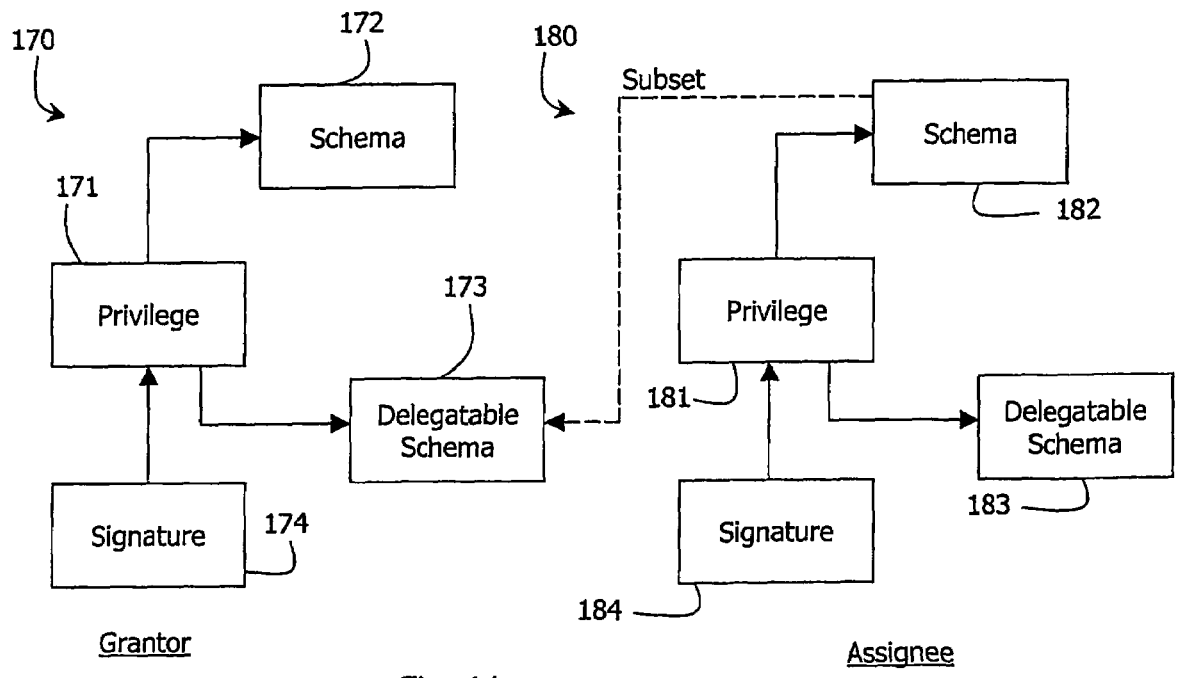
FIG. 11 is a diagram showing cascading of service provider privileges.

In the description above with reference to FIG. 1 mention is made of cascading privileges. These privileges are managed by a provisioning service of the gateway 1. The provisioning service receives an on-line request from an AP for provisioning on the gateway 1. As shown in FIG. 11 in step 160 the provisioning service on initiation of the gateway grants rights to the operator (host) of the gateway 1. In step 161 the operator in turn grants rights to a service provider (or virtual service provider) who hosts an aggregate AP. In step 162 the virtual service provider grants rights to a number of associated APs, who in turn grants right to subordinate APs in step 163. The rights which can be granted by any one party are a subset of the rights defined by a "delegatable schema" of an originating set of rights. An authorisation and policy control service of the server enforces the rights.

Referring to FIG. 12 a record 170 generated by the provisioning service includes a right 171 having a schema 172 defining the access control values, and a delegatable schema 173 defining the maximum extent of rights of an assignee of the right-holder. The record 170 also includes a digital signature 174 or other authentication data. Another record 180 generated by the provisioning service is for an assignee of the holder of the record 170. This record includes rights 181 defined by a schema 182, which is a subset of the delegatable schema 173. The record 180 also has a delegatable schema 183, allowing further cascading as the situation arises. There is also a digital signature 184 for the record 180, and for every successive record. The actual rights govern, in practice, service policy parameters such as right of access to network bearers, permitted content formats and volumes, maximum and minimum charging parameters.

It will be appreciated that the invention provides a gateway which interfaces with application provider servers in the Internet domain and with enablers in the mobile network domain to allow a wide variety of content download and user service provision to subscribers. Content or user services may be provided by a particular AP server operating independently or via a web of linked AP servers with very simple setup by virtue of the cascaded access control right mechanism. Another major advantage is the ability to efficiently perform convergence of content formats to provide the desired content format or service type for the subscriber. This is achieved despite the fact that there are a wide variety of subscriber mobile device capabilities and AP content formats. The fact that the gateway 1 interacts with mobile network enablers in two-way sessions before ultimate delivery to the subscriber also helps to achieve considerable versatility in convergence.

Another advantage of the invention is the fact that the gateway software architecture allows rapid deployment according to precise requirements set by the particular environment. The administrator simply prepares a set of XML configuration documents for each desired gateway 1 service and the service framework operates automatically to generate the service, including all internal event handling and service-to-service communication capabilities.

The invention is not limited to the embodiments described but may be varied in construction and detail. For example the gateway 1 may interface with a communications network other that a mobile network, in which case the network device capabilities are dealt with in the same manner as those of mobile devices. Specific examples of a non-mobile network are a fixed telephony or IP based subscriber network and a digital TV network.

The invention claimed is:

1. An access gateway comprising:
   a content server interface,
   a mobile network interface, and
   a processor for bi-directionally routing content-rich messages between said interfaces,
   the processor performing convergence by using a plurality of messages with differing underlying bearers to provide a single coherent message or message stream;
   said convergence being performed by conditionally processing or rendering said messages according to data received from other network systems;
   the processor including a provisioning service for managing access rights of application provider servers by:
   granting rights to an operator of the gateway,
   receiving an on-line request from a server for provisioning on the gateway,
   granting rights to a service provider hosting an aggregate application provider server;
   the aggregate application provider server granting rights to subordinate application provider servers, and
   said granted rights for a right-holder being defined in a record by the provisioning service, said record including a right having a schema defining application server access control values, and a delegatable schema defining a maximum extent of right of an assignee of a right-holder application server; and
   the processor including an authorization and policy control function to enforce said rights.

2. The access gateway as claimed in claim 1, wherein the processor includes a plurality of services, including an edge service for interfacing with the content server interface and an edge service for interfacing with the mobile network interface.

3. The access gateway as claimed in claim 1, wherein:
   the processor includes a plurality of services, including an edge service for interfacing with the content server interface and an edge service for interfacing with the mobile network interface; and
   each service includes a plurality of components, each for operating autonomously within the service in communication with other components within the same service.

4. The access gateway as claimed in claim 1, wherein:
   the processor includes a plurality of services, including an edge service for interfacing with the content server interface and an edge service for interfacing with the mobile network interface;
   each service includes a plurality of components, each for operating autonomously within the service in communication with other components within the same service; and
   each service includes a queuing mechanism and an event dispatcher, and each component places an output message in a queue of the queuing mechanism and the event dispatcher routes events from the queue to next components of the service.

5. The access gateway as claimed in claim 4, wherein each service includes routing information stored at creation of the service and the event dispatcher routes events according to said routing information.

6. The access gateway as claimed in claim 1, wherein:
   the processor includes a plurality of services, including an edge service for interfacing with the content server interface and an edge service for interfacing with the mobile network interface;
   the gateway further includes a middleware internal communications mechanism and each service includes a middleware handler for retrieving messages from a channel of the middleware communications mechanism and a handler for placing messages on a channel of the middleware communications mechanism.

7. The access gateway as claimed in claim 6, wherein a single handler of each service both retrieves messages and places messages.

8. The access gateway as claimed in claim 1, wherein:
   the processor includes a plurality of services, including an edge service for interfacing with the content server interface and an edge service for interfacing with the mobile network interface;
   each service includes a plurality of components, each for operating autonomously within the service in communication with other components within the same service; and
   at least one service includes a content protocol converter component.

9. The access gateway as claimed in claim 8, wherein said component converts between an external content protocol and a content protocol which is internal to the gateway and is used for processing of content by the gateway between the two interfaces.

10. The access gateway as claimed in claim 1, wherein:
    the processor includes a plurality of services, including an edge service for interfacing with the content server interface and an edge service for interfacing with the mobile network interface;

each service includes a plurality of components, each for operating autonomously within the service in communication with other components within the same service; and at least one service includes a logic rule component for processing message content.

11. The access gateway as claimed in claim 1, wherein the processor includes a work flow manager for routing messages within the gateway.

12. The access gateway as claimed in claim 1, wherein:
the processor includes a work flow manager for routing messages within the gateway; and
the work flow manager routes a message by parsing a message to determine a routing list.

13. The access gateway as claimed in claim 1, wherein:
the processor includes a work flow manager for routing messages within the gateway;
the work flow manager routes a message by parsing a message to determine a routing list; and
the work flow manager embeds a routing list within the message.

14. The access gateway as claimed in claim 1, wherein:
the processor includes a work flow manager for routing messages within the gateway;
the work flow manager routes a message by parsing a message to determine a routing list;
the work flow manager embeds a routing list within the message; and
the work flow list is embedded as an extension to an internal-format mark-up language within the message.

15. The access gateway as claimed in claim 1, wherein:
the processor includes a work flow manager for routing messages within the gateway; and
the work flow manager is a service within the gateway.

16. The access gateway as claimed in claim 1, wherein:
the processor includes a work flow manager for routing messages within the gateway;
the work flow manager is a service within the gateway; and
the gateway includes a middleware communications mechanism, the work flow manager service subscribes to a default middleware channel, and an edge service automatically places a message received at either server interface onto the default channel.

17. The access gateway as claimed in claim 16, wherein each service places a message onto the default channel if it does not detect a next service indicator in the work flow list.

18. The access gateway as claimed in claim 1, wherein:
the processor includes a plurality of services, including an edge service for interfacing with the content server interface and an edge service for interfacing with the mobile network interface; and
a service is a transaction logging service and said service terminates a message by storing message data if there is no next service in the work flow list.

19. The access gateway as claimed in claim 1, wherein:
the processor manages linkages between the gateway and external systems for convergence.

20. The access gateway as claimed in claim 1, wherein the processor converts a content format in a received message to an internal format and processes the message in said internal format.

21. The access gateway as claimed in claim 20, wherein the internal format is a mark-up language.

22. The access gateway as claimed in claim 1, wherein:
the gateway receives an input message with content of a first format, converts the first format to an internal format, converts the internal format to a second format and routes the message to an external system, receives a response from said external system with said content in a third format, converts said third format to the internal format, and generates an output message with said content in a fourth format.

23. The access gateway as claimed in claim 1, wherein said provisioning service automatically checks a fresh request for access rights and user service policy against a schema of an existing set of rights.

24. The access gateway as claimed in claim 1, wherein said provisioning service communicates with other services of the gateway via an internal middleware mechanism.

25. The access gateway as claimed in claim 1, wherein the record includes authentication data.

26. The access gateway as claimed in claim 25, wherein the authorization data is a digital signature.

27. The access gateway as claimed in claim 1, wherein the provisioning service generates a plurality of records, in which there is a record for each right-holder, and the records are linked in a cascading structure in which successive records define a subset of rights of a preceding record.

28. A method of operation of an access gateway comprising a content server interface, a mobile network interface, and a processor, the method comprising the steps of
routing content-rich messages between said interfaces by the processor bi-directionally;
performing convergence by the processor using a plurality of messages with differing underlying bearers to provide a single coherent message or message stream;
performing said convergence by conditionally processing or rendering said messages according to data received from other network systems;
managing a provisioning service of the processor to access rights of application provider servers by:
granting rights to an operator of the gateway,
receiving an on-line request from a server for provisioning on the gateway, and
granting rights to a service provider hosting an aggregate application provider server;
granting rights to subordinate application provider servers by the aggregate application provider server; and
defining said granted rights for a right-holder in a record by the provisioning service, said step of defining including defining a right having a schema defining application server access control values, and a delegatable schema defining a maximum extent of right of an assignee of a right-holder application server; and
enforcing said rights by an authorization and policy control function of the processor.

29. The method as claimed in claim 28, wherein the processor includes a plurality of services, including an edge service for interfacing with the content server interface and an edge service for interfacing with the mobile network interface; and each service includes a plurality of components, and each component operates autonomously within the service in communication with other components within the same service.

30. A computer program product comprising software code on a computer-readable medium being executed on digital computer, said software code configured to:
route content-rich messages between said interfaces by the processor bi-directionally;
perform convergence by the processor using a plurality of messages with differing underlying bearers to provide a single coherent message or message stream;

perform said convergence by conditionally processing or rendering said messages according to data received from other network systems:

manage a provisioning service of the processor to access rights of application provider servers by:

granting rights to an operator of the gateway, receiving an on-line request from a server for provisioning on the gateway, and granting rights to a service provider hosting an aggregate application provider server;

grant rights to subordinate application provider servers by the aggregate application provider server;

define said granted rights for a right-holder in a record by the provisioning service, said step of defining including defining a right having a schema defining application server access control values, and a delegatable schema defining a maximum extent of right of an assignee of a right-holder application server; and enforce said rights by an authorization and policy control function of the processor.

* * * * *